Feb. 15, 1955    F. H. STEARNS    2,702,216
BEARING AND METHOD OF MAKING SAME
Filed Nov. 24, 1950    2 Sheets-Sheet 1

INVENTOR
FRANK H. STEARNS
BY Owen W. Kennedy
ATTORNEY

Feb. 15, 1955 F. H. STEARNS 2,702,216
BEARING AND METHOD OF MAKING SAME
Filed Nov. 24, 1950 2 Sheets-Sheet 2

INVENTOR
FRANK H. STEARNS
BY Owen W. Kennedy
ATTORNEY

United States Patent Office 2,702,216
Patented Feb. 15, 1955

2,702,216

BEARING AND METHOD OF MAKING SAME

Frank H. Stearns, Meriden, N. H., assignor to Split Ball-bearing Corporation, Lebanon, N. H., a corporation of New Hampshire Application November 24, 1950, Serial No. 197,290

10 Claims. (Cl. 308—196)

The present invention relates to bearing structures of the divisible race type, in which the outer race element is fractured in order to permit expansion thereof for the insertion of bearing balls or rollers.

In the copending application of Frank H. Stearns and Arthur J. Thibault, filed April 2, 1949, Serial No. 85,074, now Patent Number 2,648,578, there is shown and described a bearing with an outer race element which is in the form of a unitary ring fractured longitudinally of its axis in a predetermined radial plane, with a pair of abutting broken ends at the fracture. Since this ring has been hardened prior to its fracture, its broken ends are normally positioned in intimate interlocking relation by the inherent resiliency of the hardened metal. Therefore, when the ring is expanded by separating the broken ends under pressure to permit the insertion of bearing balls or rollers, release of the expanding pressure results in the ring resuming its original form with its fractured ends in intimate relation.

The present invention relates to improvements in the bearing construction disclosed in the aforesaid copending application, and in the manner of making the same, whereby bearings embodying the present invention can be readily produced. Briefly stated, the present invention contemplates provision of a fractured bearing ring so formed that a complete series of bearing balls may be inserted therein when the fractured ring is opened in response to pressure exerted by the balls themselves on a beveled portion of the ring. As a result of this improved mode of assembly, a complete bearing is produced, with the assurance that the rings and balls entering into any bearing, will not be damaged during the assembly operation, due to accurate indexing of the bearing elements.

The above and other advantageous features of the invention will hereinafter more fully appear from the following description, considered in connection with the accompanying drawings, in which, Fig. 1 is a plan view of a bearing race ring embodying the present invention.

Figure 1:
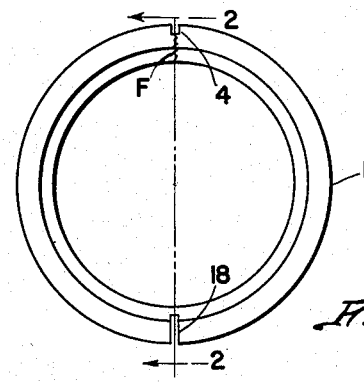
Figure 2:
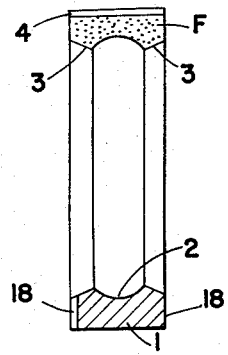
Fig. 2 is a transverse sectional view along the line 2—2 of Fig. 1.

Referring first to Figs. 1 and 2, the invention is shown as being embodied in an outer race element 1 made in the form of a ring from a single cylindrical piece of metal. This ring is machined to its final dimensions, both inside and out, with the inner surface of the ring being provided with a ball-receiving groove 2, located centrally of the ring. The inner surface of the ring 1 is also provided with lands 3 on opposite sides of the groove 2, with these lands 3 inclined outwardly with respect to the longitudinal axis of the ring 1. The inclination of the lands 3 is shown as being at a relatively small angle with respect to the ring axis, which angle will vary in accordance with the cross section of the ring and the depth of ball-receiving groove therein, as will later appear.

The ring 1 also provides a score 4 extending across the outside surface of the ring, parallel to its longitudinal axis. The purpose of this score 4 is to form a plane of weakness in the ring, so that when it is broken, the fracture will occur in a substantially radial plane. Following the formation of the ring 1 with its groove 2, lands 3 and score 4, the ring is hardened by suitable heat treating methods, the ultimate degree of hardness being such as to permit the ring to be separated in the area of its subsequent fracture a predetermined distance, without exceeding the elastic limit of the metal, from which the ring is made.

After the ring 1 has been hardened, it is broken along the plane of weakness, as determined by the location of the score 4, with the breaking force being applied at right angles to this plane. The particular means employed for breaking the ring 1, forms no part of the present invention, although preferably, the expansion members disclosed in the aforesaid copending application, Serial No. 85,074, are used to insure that the fracture occurs in a generally radial plane opposite to the score 4, with the irregular line of fracture being indicated at F in Fig. 1.

It is to be understood that the fracturing described above, does not distort the ring itself, and that the ring 1, after fracturing, will present an entirely closed formation, as shown in Fig. 1. Also, it will be appreciated that the existence of the fracture F will not present any detrimental parting line in the area of the ball-receiving groove 2, since the inner surfaces of the ring in the zone of fracture, mate together in perfect interlocking relation in the complete bearing.

Figure 3:
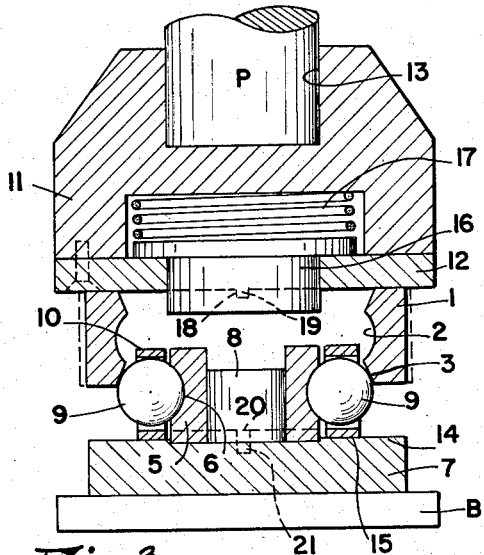
Fig. 3 is a view partially in section, and partially in side elevation, illustrating the procedure for assembling the parts of a bearing embodying the present invention.

Referring now to Fig. 3, there is shown an arrangement of fixtures for assembling the parts of a bearing embodying the present invention. In this arrangement, an inner race in the form of a solid ring 5 with a ball-receiving groove 6, is placed in position on a fixture 7 resting on the stationary base B of a suitable press. This fixture 7 provides a centrally located cylindrical projection 8 which fits the inside of the race ring 5, and holds the latter in position. A series of bearing balls 9 are then placed in position within the pockets of a cage 10 surrounding the ring 5, which cage serves to maintain the balls 9 in spaced relation around the groove 6.

The previously fractured outer race ring 1 is then placed in position with one beveled land 3 resting on the balls 9, and the ring 1 is held in axial alignment with the ring 5 on the fixture 7, by means of a fixture 11 having a flat plate 12 which rests on the upper face of the ring 1. The fixture 11 provides an opening 13, at its top, for receiving the lower end of the plunger P of the press. Fig. 3 illustrates the position occupied by the parts of the bearing and the associated fixtures at the start of the assembly operation, which is accomplished by moving the plunger P of the press downwardly with respect to the stationary base B.

Figure 4:
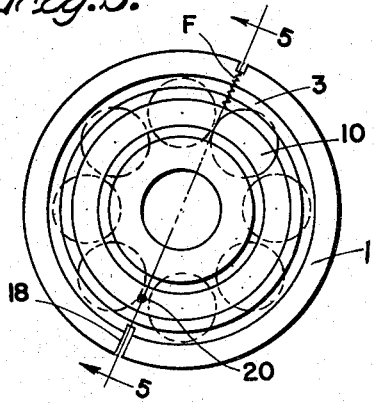
Fig. 4 is a plan view of a complete bearing.

As the fixture 11 carries the outer race ring 1 downwardly with respect to the inner race ring 5 on the fixture 7, the balls 9, in cooperation with the beveled land 3 of the ring 1, will cause the outer ring 1 to spread at the fracture F. This spreading of the ring 1 is indicated in dotted lines in Fig. 3, from which it is apparent that the ring 1 will spread until the balls 9 can pass over the ridge between the inside of the land 3, and the ball-receiving groove 2. As soon as this happens, the inherent resiliency of the spread ring 1 will cause it to contract, and thereby position all of the balls 9 within the groove 2, thus completing the assembly of the bearing in which the component parts have the relation shown in Fig. 4.

When the shoulder between the land 3 and the groove 2 passes over the balls 9, as the ring 1 reaches its maximum degree of spread, the tension thus developed in the ring, will cause the ring to snap back into its original form, wherein the abutting edges of the fracture F are in interlocking relation. Since the force of this snap action might damage the fractured surfaces, the fixture 7 is provided with means for preventing the fractured ends of the ring 1 from coming entirely together, as the pressing operation is completed. For this purpose, the fixture 7 provides a surface 14 surrounding the central projection 8 which holds the inner race ring 5 in position. It will be noted that this surface 14 is above a surface 15 on which the ring 5 rests when mounted on the projection 8.

Figure 3A:
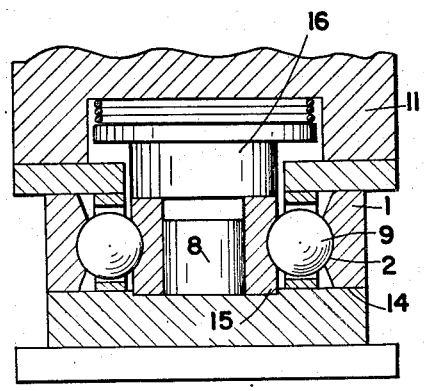
Fig. 3a is a fragmentary view illustrating the completion of a bearing assembly.
Figure 5:
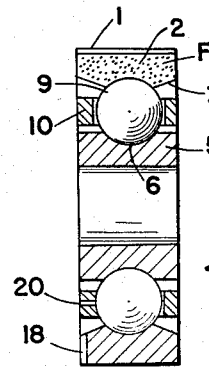
Fig. 5 is a transverse sectional view along the line 5—5 of Fig. 4.

Therefore, as the fixture 11 completes its downward movement, as shown in Fig. 3a, the lower edge of the outer race ring 1 will engage the surface 14, so that the race rings 1 and 5 are not in exact alignment with each other. As a result, the balls 9 cannot seat themselves fully in the groove 2, and the outer race ring 1 cannot snap back to its original form with the fractured ends thereof in close interlocking relation. Obviously, as soon as the assembled ball bearing is removed from the projection 8 of the fixture 7, the fractured ends of the race 1 can come together, with the race rings 1 and 5 in proper alignment, as shown in the completed bearing of Fig. 5.

To insure that the inner race ring 5 does not shift upwardly, with respect to the outer race ring 1, by an amount equal to the displacement between the surfaces 14 and 15, the upper fixture 11 provides a centrally located core 16, which engages the top of the inner ring 5 as the pressing operation is completed. Since the lower face of the core 16 will engage the race ring 5 before the lower edge of the outer ring 1 engages the surface 14, as shown in Fig. 3a, the core 16 is capable of yielding upwardly within the fixture 11. For this purpose, a spring 17 serves to press the core outwardly, so that it will exert a yielding pressure on the inner race ring 5 to hold it closely in engagement with the fixture surface 15.

The above described apparatus for assembling the parts of a bearing, also provides means for indexing the balls 9 with respect to the fracture F in the outer race ring 1. It is most essential in this type of bearing, that a ball must not contact the fracture in the outer race ring under pressure, for otherwise, the ball might damage the fractured surfaces, and subsequently prevent these surfaces from accurately engaging in interlocking relation, as shown in the assembled bearing of Fig. 5.

In the assembly of a cage-type bearing, such as is illustrated in Fig. 3, this indexing is accomplished by positively holding the fractured outer ring 1 in a predetermined position by an indexing slot 18 extending radially across the face of the ring 1, as shown in Fig. 1. It is to be noted that while the indexing slot 18 is shown as being diametrically opposed to the score 4, along which the ring is broken, the slot 18 may be placed elsewhere between the balls. As best shown in Fig. 3, this slot 18 is engaged by a tongue 19 provided on the lower surface of the fixture plate 12, so that the outer bearing ring 1 is maintained against angular movement about its central axis at the very start of the assembly operation.

In order to prevent any ball 9 of the series contained within the cage 10 from engaging the fracture F of the outer ring 1, the cage 10 provides an opening 20 for the reception of a pin 21 projecting upwardly from the surface 14 of the lower fixture 7. Since this pin 21 is diametrically opposite the fracturing score 4 on the ring 1, when the latter is indexed on the fixture 11 by the cooperating slot 18 and the tongue 19, reception of the pin 21 in the opening 20 will also index the cage 10. This indexing of the cage 10 is illustrated clearly in Fig. 4, from which it is apparent that it will be impossible for any ball 9 to engage the beveled land 3 of the outer ring at the fracture F. Therefore, the assembly of a bearing is completed without any possibility of a ball engaging the fractured edges of the ring 1 under pressure, so as to chip or otherwise damage the same.

In the foregoing, the construction and mode of assembly of a bearing with a single row of balls has been described, with bearing balls positioned within a cage. The present invention also contemplates its embodiment in a bearing having a double row of balls, wherein a cage is not employed, this type of cageless bearing being also known as a full race bearing.

Figure 6:
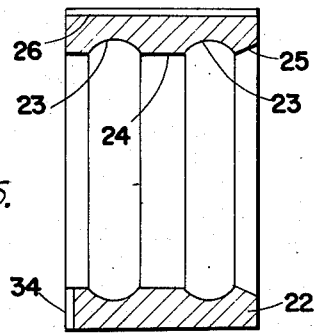
Fig. 6 is a transverse sectional view of a modified form of bearing race ring embodying the present invention.

Referring now to Fig. 6, there is shown the construction of a full race, double row bearing, in which the outer race ring 22 is formed from a single cylindrical piece of metal provided with a pair of spaced ball-receiving grooves 23. The inner surface of the ring 22 is provided with annular lands 24 on opposite sides of one groove 23, and with a beveled land 25 surrounding the other groove 23. The ring 22 also provides a score 26 extending across its surface, the purpose of this score 26 being to form a plane of weakness in the ring, so that its subsequent fracture will occur in a substantially radial plane, as previously described with reference to ring 1.

Figure 7:
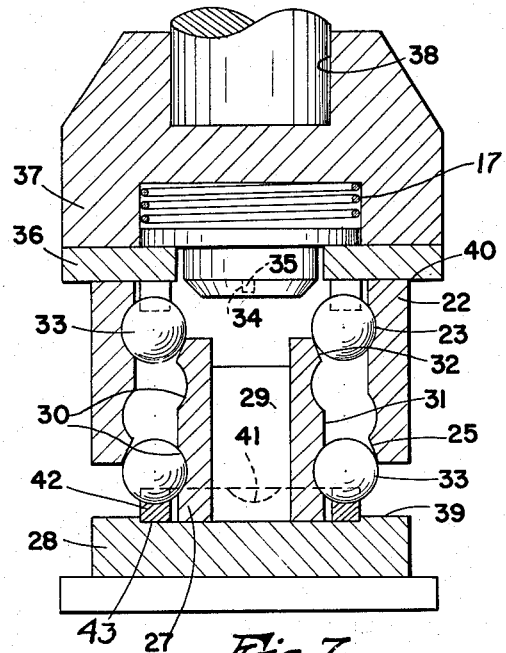
Fig. 7 is a view partially in section, and partially in side elevation, illustrating the manner of assembling a complete bearing embodying the race ring of Fig. 6.

The manner of utilizing this ring 22 in the assembly of a complete double row bearing, is illustrated in Fig. 7, wherein an inner race ring 27 is shown as having been placed in position on a fixture 28 providing a central projection 29. This inner ring 27 provides ball-receiving grooves 30 of the same form as the grooves 23 of the ring 22, with annular lands 31 and a beveled land 32 facing upwardly.

The balls 33 for one row are shown as having been assembled in the lower groove 30 of the ring 27, with the beveled land 25 of the outer ring 22 resting on these balls. With the ring 22 in this position, the balls 33 for the other row can be assembled in the upper groove 23 of the ring 22, with portions of these balls resting on the beveled land 32 of the inner ring 27. It is also to be noted that the outer ring 22 provides an indexing slot 34 for cooperation with a tongue 35 provided on the lower face of the pressure plate 36 of a fixture 37, which provides a central opening 38 for the reception of the plunger of a suitable press.

Figure 7A:
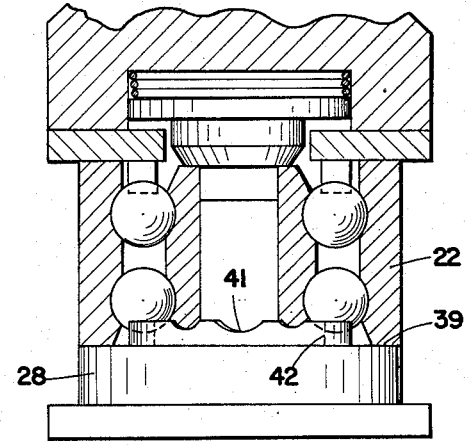
Fig. 7a is a fragmentary view illustrating the completion of a bearing assembly.
Figure 8:
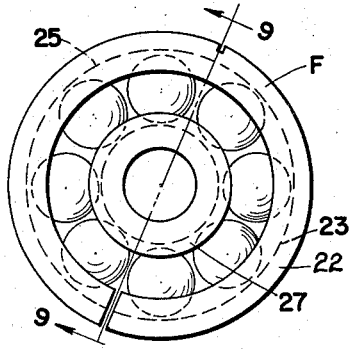
Fig. 8 is a plan view of a complete bearing resulting from the assembly procedure illustrated in Fig. 7.

In order to index the two rows of balls 33, the upper surface 39 of the lower fixture 28, and the under surface 40 of the upper fixture plate 36, provide a series of pockets 41 for spacing the balls 33 apart, so that no ball will register with the fracture F of the outer ring 22. These pockets 41 are shown in Fig. 7a as being formed in ribs 42, projecting from the surfaces 39 and 40 respectively, so that when the parts of the bearing are assembled between the fixtures 28 and 37, as shown in Fig. 7, each ball 33 will be positively positioned so that it cannot engage the fracture F in the outer ring 22, as will be apparent from the showing of a completed double row bearing in Fig. 8.

Figure 9:
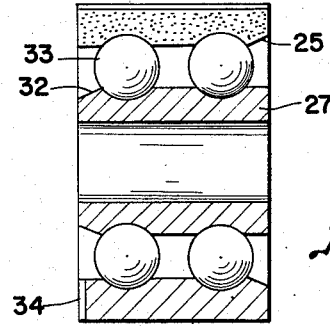
Fig. 9 is a transverse sectional view along the line 9—9 of Fig. 8.

The parts of a double row bearing having been assembled between the fixtures 28 and 37, as shown in Fig. 7, the upper fixture 37 is moved downwardly with respect to the lower stationary fixture 28 by the operation of the press plunger. As this occurs, the lower row of balls 33 in engagement with the beveled land 25 of the outer ring 22, and the upper row of balls 33 in engagement with the beveled land 32 of the inner ring 27, will exert pressure sufficient to spread the ring 22 at the fracture F. This spreading of the ring 22 takes place uniformly because of the wedging action of both beveled lands 25 and 32, and the spreading continues until both rows of balls 33 can pass over the ridges between the lands 25 and 32, and the adjacent ball-receiving grooves 23 and 30. As soon as this occurs, the inherent resiliency of the spread ring 22 will cause it to contract, and thereby position all of the balls in the grooves 23 and 30, respectively, thus completing the assembly of a full race, double row bearing, in which the component parts have the relation shown in Figs. 8 and 9.

In order to prevent the fractured ends of the ring 22 coming together with a snap action, such as might damage the fractures, the previously mentioned surface 39 of the lower fixture 28 is slightly above the surface 43, on which the inner ring 27 rests when mounted on the projection 29. Therefore, as the fixture 37 completes its downward movement, the lower edge of the outer race ring 22 will engage the surface 39, so that the race rings 22 and 27 are not in exact alignment with each other. As a result, the balls 33 cannot seat themselves fully in the grooves 23 and 30, and the outer race ring 22 cannot return entirely to its original form with its fractured ends in close interlocking relation. Obviously, as soon as the assembled bearing is removed from the projection 29 of the fixture 28, the fractured ends of the race ring 22 can come together without any appreciable force, with the race rings 22 and 27 in proper alignment, as shown in the completed bearing of Fig. 9.

The above described procedure for assembling the parts of a full race, double row bearing, can also be employed in connection with the assembly of a full race, single row bearing. When assembling such a bearing, it is necessary to provide only one of the fixtures with ball indexing pockets 41, such as are shown in Fig. 7a, with such pockets preferably being provided on the lower fixture. Otherwise, the procedure is the same as previously described with reference to Fig. 7.

Figure 10:
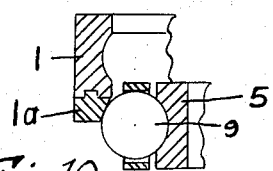
Fig. 10 is a fragmentary view illustrating a further modification of the invention.

From the foregoing, it is apparent that by the present invention, there is provided an improved bearing structure of the divisible race type, in which the outer race ring of a single or double row bearing is fractured in order to permit its expansion for the insertion of bearing balls. Furthermore, this fractured race ring is so constructed that it will spread sufficiently to receive the balls in response to a pressure exerted by the balls themselves on a wedging surface slightly inclined with respect to the ring axis. This inclined surface can be formed either directly on the race ring 1, as shown in Fig. 3, or can be formed on an auxiliary ring 1a which is attached to the race ring during the assembly operation, as shown in Fig. 10. Obviously the contour of this inclined surface can be flat, or slightly concave, in order to obtain the desired wedging action in cooperation with the balls.

I claim:

1. A race ring for a ball bearing comprising an integral, resilient ring having an internal raceway and a longitudinal fracture to provide normally abutting ends, said ring also having an outwardly beveled inner edge surface adjacent said raceway.

2. A race ring for a ball bearing comprising an integral, resilient ring having an internal raceway and a longitudinal fracture to provide normally abutting ends, said ring also having an angularly disposed edge at the intersection of the internal surface and a flat end face of said ring.

3. A bearing structure comprising inner and outer rings having complementary external and internal raceways respectively, and a plurality of bearing elements disposed within said raceways, the outer of said rings being integral and fractured lengthwise to provide abutting ends normally held in intimate interlocking relation by the inherent resiliency of the ring, said outer ring having a beveled portion extending outwardly from one edge of its raceway to render said ring expansible in response to pressure applied by said bearing elements to said beveled portion in the direction of the ring axis.

4. A bearing structure comprising inner and outer rings having complementary external and internal raceways respectively, and a plurality of bearing elements disposed within said raceways, the outer of said rings being integral and fractured lengthwise to provide abutting ends normally held in intimate interlocking relation by the inherent resiliency of the ring, said outer ring having an angularly disposed edge at the intersection of the internal surface and a flat side of said outer race ring to render said ring expansible in response to pressure applied by said bearing elements to said broken edge in the direction of the ring axis.

5. A ball bearing structure comprising an inner race ring and an integral, longitudinally fractured, resilient outer race ring, said inner ring having first and second external raceways, said outer ring having first and second internal raceways complementary respectively to said first and second external raceways, a plurality of balls disposed in said first raceways of the rings and a plurality of balls disposed in said second raceways of the rings, said inner ring having an inwardly beveled portion between the edge of the first external raceway and the adjacent end of the ring, and said outer ring having an outwardly beveled portion between the edge of the second internal raceway and the adjacent end of the ring whereby the outer ring is rendered expansible during assembly of the bearing in response to forces applied by the balls when wedged between the beveled portion of said inner ring and said first internal raceway and between said beveled portion of said outer ring and said second external raceway respectively.

6. The method of assembling a ball bearing which includes positioning a plurality of balls about an inner race ring having an external raceway for said balls, positioning on said balls in substantially axial alignment with said inner ring an integral, longitudinally fractured resilient outer race ring having an internal raceway, and subjecting said inner and outer race rings to forces in the direction of their axes in amount sufficient to cause said outer ring to separate at the fracture and expand in response to the wedging action of the balls between said race rings to permit the balls to be received into the raceway of the outer ring.

7. The method of assembling a ball bearing which includes positioning a plurality of balls about an inner race ring having an external raceway for said balls, positioning on said balls in substantially concentric alignment with said inner ring an integral, longitudinally fractured resilient outer race ring having an internal raceway and a beveled surface adjacent the inner raceway, said beveled surface in contact with said balls, and subjecting said inner and outer race rings to forces in the direction of their axes in amount sufficient to cause said outer race ring to separate at the fracture and expand in response to the wedging of the balls between said race rings to permit the balls to be received into the raceway of said outer ring.

8. The method of assembling a ball bearing which includes positioning a plurality of balls about an inner race ring having an external raceway for said balls, positioning on said balls in substantially concentric alignment with said inner ring an integral, longitudinally fractured, resilient outer race ring having an internal raceway, indexing said balls with respect to said outer ring to position the edges of the fracture between the points of contact of adjacent balls with the outer ring, subjecting said inner and outer race rings to forces in the direction of their axes in amount sufficient to cause said outer ring to separate at the fracture and expand in response to the wedging action of the balls between said race rings to permit the balls to be received into the raceway of the outer ring.

9. The method of assembling a ball bearing which includes positioning a plurality of balls about an inner race ring having an external raceway for said balls, positioning on said balls in substantially concentric alignment with said inner ring an integral, longitudinally fractured resilient outer race ring having an internal raceway and a beveled surface adjacent the inner raceway, said beveled surface in contact with said balls, subjecting said inner and outer race rings to forces in the direction of their axes in amount sufficient to cause said outer race ring to separate at the fracture and expand in response to the wedging action of the balls between said race rings to permit the balls to be received into the raceway of said outer ring, and restraining said rings from suddenly assuming an exactly aligned relation as said balls pass the junction between said beveled surface and the raceway of said outer ring to prevent the ends of the ring at the fracture from forcibly re-engaging each other as the ring contracts upon the balls.

10. A method of assembling a ball bearing which includes positioning a first plurality of balls about the first of two external raceways of an inner race ring, positioning on said first balls in substantially concentric alignment with said inner ring an integral, longitudinally fractured, resilient outer race ring having first and second internal raceways complementary to said first and second internal raceways and having an outwardly beveled portion between an edge of the first internal raceway and the adjacent end of the ring, said beveled portion of the outer ring in contact with the first balls, positioning a second plurality of balls between said second internal raceway and an inwardly beveled portion of said inner ring between an edge of said second external raceway and the adjacent end of the ring, indexing said first and second balls with respect to said outer ring to position the edges of the fracture between the points of contact of adjacent balls with the outer ring, subjecting said inner and outer race rings to forces in the direction of their axes to cause said outer ring to separate at the fracture and expand in response to the wedging action of the balls between said race rings to permit the first and second balls to be received into the first internal and the second external raceways respectively, and restraining said rings from suddenly assuming an exactly aligned relation as the balls pass the junctions of the beveled surfaces and the raceways to prevent the fractured ends of the outer rings from forcibly re-engaging each other as the ring contracts upon the balls.

References Cited in the file of this patent

UNITED STATES PATENTS

| | | |
|---|---|---|
| 845,632 | Gurney | Feb. 26, 1907 |
| 881,471 | Hoffman | Mar. 10, 1908 |
| 967,519 | Hess | Aug. 16, 1910 |
| 1,498,748 | Pierce | June 24, 1924 |

FOREIGN PATENTS

| | | |
|---|---|---|
| 2,607 | Great Britain | 1906 |
| 49,052 | Sweden | Feb. 4, 1918 |